United States Patent [19]

Iyer et al.

[11] Patent Number: 5,332,477
[45] Date of Patent: Jul. 26, 1994

[54] METHOD FOR REDUCING PRESSURE DROP IN A PACKED COLUMN

[75] Inventors: Sundareswaran P. Iyer; Robert H. Jones, Jr., both of Baton Rouge, La.; David R. Smith, Bright's Grove, Canada

[73] Assignee: Ethyl Corporation, Richmond, Va.

[21] Appl. No.: 136,964

[22] Filed: Oct. 14, 1993

[51] Int. Cl.⁵ .................... B01D 1/02; B01D 3/34
[52] U.S. Cl. .................... 203/20; 203/49; 95/155; 202/158; 202/234; 202/264; 261/DIG. 72
[58] Field of Search ............ 203/20, 49, 96, 92, 203/99; 202/264, 158, 234, 153; 95/155; 261/DIG. 72

[56] References Cited

U.S. PATENT DOCUMENTS

| | | | |
|---|---|---|---|
| 2,253,261 | 8/1941 | Bacon | 261/DIG. 72 |
| 2,433,060 | 12/1947 | Ohsol et al. | 203/20 |
| 2,523,441 | 9/1950 | McKamy | 261/DIG. 72 |
| 3,027,307 | 3/1962 | Stoffer et al. | 203/20 |
| 3,306,341 | 2/1967 | Pugh et al. | 203/20 |
| 3,592,613 | 7/1971 | Boyd | 261/DIG. 72 |
| 3,810,348 | 5/1974 | Byers et al. | 261/98 |
| 3,979,192 | 9/1976 | Hobbs et al. | 95/155 |

FOREIGN PATENT DOCUMENTS 1126305  11/1984  U.S.S.R. .................... 203/20

*Primary Examiner*—Wilbur Bascomb, Jr.

[57] ABSTRACT

This invention relates to a method for decreasing the pressure drop in a column used for contacting at least one gaseous stream and at least one liquid stream, wherein a portion of the pressure drop across the column is caused by foam. The method comprises injecting a non-foamable liquid into the gaseous stream at a location, in an amount, and at a temperature which are sufficient to decrease the total pressure drop across the column.

20 Claims, 1 Drawing Sheet

METHOD FOR REDUCING PRESSURE DROP IN A PACKED COLUMN

BACKGROUND

This invention relates to a facile economic method for reducing the pressure drop in packed columns.

Packed columns are used for a variety of applications in the chemical process and related industries. Some of the common uses of packed columns include stripping columns for contact between a gaseous stream and a liquid stream for removal of a material or component from the liquid stream, scrubbing columns for contact and reaction between a scrubbing fluid with a liquid or gaseous stream, extraction columns for concentration of a component in the fluid streams, reaction columns for contact and reaction between liquid and/or gaseous streams, distillation columns for separation and concentration of liquid and gaseous stream components, and the like.

In the design of the packed column, a key factor is the pressure drop of the liquid and/or vapor streams through the selected packing material. During the operation of the packed column, the pressure drop through the packing material may increase due to plugging of the packing, poor liquid or gaseous distribution, breaking of the packing material, use of incorrect packing, incorrect packing procedures and the like. Most packed columns are designed based on empirical data obtained from operation of similar systems. However, when the actual packed column system behaves in an unexpected manner, such that the pressure drop through the column is much higher than predicted or expected, the usual solutions are to substitute the packing with different packing, provide a larger packed column, or redesign all or a portion of the packed column. All of these solutions are costly and time consuming.

SUMMARY OF THE INVENTION

A facile economic method for reducing the pressure drop across a column used for contacting at least one gaseous stream and at least one liquid stream has now been discovered wherein at least a portion of the pressure drop is caused by foam. The method comprises injecting an amount of an essentially non-foamable liquid into the gaseous stream prior to contact of the gaseous stream with the liquid stream, wherein the amount of non-foamable liquid is sufficient to decrease the pressure drop across the column by at least about 20 percent based on the total pressure drop across the column prior to injecting the non-foamable liquid.

For the purposes of this invention, "foam" means coarse dispersions of gas in a relatively small amount of liquid. Foam bubbles may vary in size from about 50 microns to several millimeters in diameter and foam densities may range from about 20 grams per liter to about 500 grams per liter. In some cases, foam is desirable, such as in soaps, shaving creams, and bubble-bath compositions. However, in the operation of distillation or fractionation towers, scrubbing columns, stripping columns, and the like, where rapid vapor flow may cause a build up of a large volume of dynamic foam, foam can cause severe problems. Until now, it was common practice to provide extra capacity in gas-liquid contact towers for contacting liquids which are prone to foaming. It has now been discovered that the injection of a non-foamable liquid into the gaseous stream at a particular location in a column can significantly reduce the pressure drop caused by foam. While not desiring to be bound by theory, it is believed that the non-foamable liquid reduces the amount of foam by mechanical or thermal shock thereby inhibiting formation of foam and/or bursting the foam bubbles.

BRIEF DESCRIPTION OF DRAWINGS

The FIGURE is an illustration, not to scale, of a packed column utilizing the method of this invention for reducing pressure drop.

DETAILED DESCRIPTION OF THE INVENTION

Figure 1:
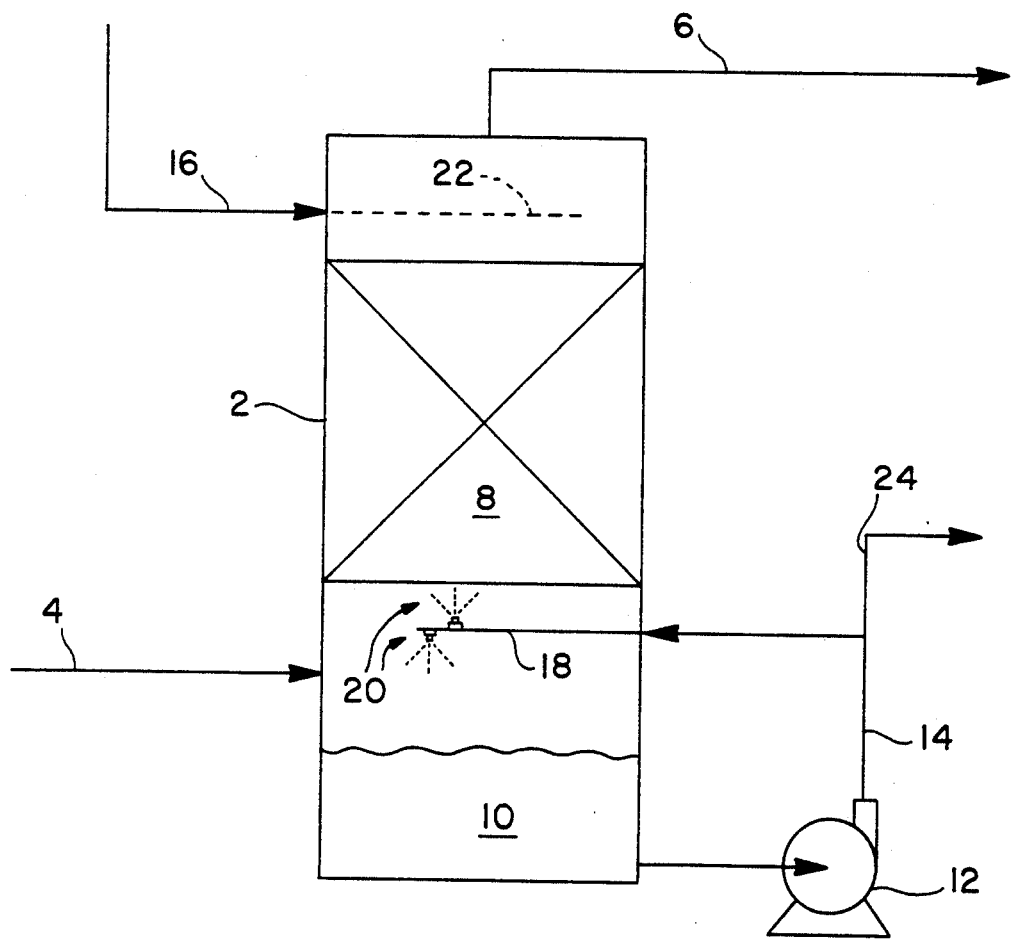

In one embodiment, this invention provides a method for reducing pressure drop in a column used for contacting at least one gaseous stream and at least one liquid stream, wherein a portion of the pressure drop through the column is caused by foam. The method comprises, injecting an amount of an essentially non-foamable liquid into the gaseous stream prior to contact of the gaseous stream with the liquid stream. The amount of non-foamable liquid injected into the gaseous stream is that amount which is sufficient to decrease the pressure drop by at least about 20 percent based on the total pressure drop across the column prior to injecting the non-foamable liquid.

In another embodiment, this invention provides a method for reducing pressure drop in a packed column containing at least one packed section and having (i) at least one circulating, foamable liquid stream; and (ii) at least one gaseous stream whereby contact between (i) and (ii) in the packed column produces a foam sufficient to increase pressure drop across the packed section of the column wherein the column has a characteristic flooding pressure drop. The method comprises reducing pressure drop in the packed column by:

a) providing an amount of at least one essentially non-foamable liquid; and b) injecting the non-foamable liquid into the gaseous stream at a location and in an amount which are sufficient to reduce the pressure drop in the packed column to less than 90 percent of the flooding pressure drop.

The invention is suitable for reducing pressure drop in any type of gas/liquid contact equipment susceptible to the generation or formation of foam. Accordingly, the invention can be used for reducing the pressure drop in tray distillation or fractionation columns; or in packed columns used for scrubbing, stripping, distilling, extracting, and the like. The type and configuration of the gaseous/liquid contact equipment is not critical to the invention provided foam is formed in the equipment, and the foam increases the pressure drop in the equipment. In a preferred embodiment, the invention is utilized with an elongated upright column containing trays and/or one or more packed sections wherein a gaseous stream is injected into the lower portion of the upright column and a liquid is circulated in the column in a countercurrent manner to the gaseous stream.

In a particularly preferred embodiment, the invention provides a means for reducing the pressure drop in a packed column used for scrubbing or stripping operations. The column may contain one or more packed sections for obtaining contact between a gaseous and a liquid stream to strip the liquid stream or scrub the gaseous stream. Suitable packing for use in the column includes saddles, rings, pellets, balls, various shaped packing, and the like made from metals, plastics, ceramics, and the like.

The gaseous streams which may be scrubbed or which may be used in stripping a liquid stream can be any gaseous or vaporous material. Suitable gaseous or vaporous materials include air, carbon dioxide, steam, nitrogen, argon, hydrogen, ammonia, and the like which may be relatively pure or may contain other components such as hydrocarbons, halogens, sulfur dioxide, carbon monoxide, and the like.

The liquid stream can be any liquid phase stream susceptible to foam formation. Such steams are typically aqueous streams containing organic or non-polar materials, but may be essentially organic hydrocarbon streams (e.g., liquid esters, liquid phosphates, liquid silicons, liquid polyethers, liquid fatty acids, and the like) containing minor amounts of impurities. For the purposes of this invention, the particular gaseous and liquid streams contacted in the gaseous/liquid contact equipment is not critical to the invention provided there is a material susceptible to foam formation and the foam produces an undesirable increase in pressure drop in the equipment.

In the case of gaseous/liquid contact columns containing trays or packing, there is a particular pressure drop through the column packed section or trays which will result in a condition known as "flooding". "Flooding" or phase inversion occurs when there is liquid hold-up in the column and occlusion of the openings in the column trays or between adjacent packing units over the cross section of the column. It is believed that flooding occurs when the downward pressure of the descending liquid film or droplets equals the upward velocity pressure of the rising vapor or gaseous stream. The flooding point or "flooding pressure drop" represents the upper limiting conditions of pressure drop and liquid and/or gaseous flow rates for practical tower operation. The primary factors that affect pressure drop in columns are (i) the flow rates of the liquid and gaseous streams, (ii) the density and viscosity of the liquid and gaseous streams, (iii) the amount of foam present in the column, and (iv) the shape, orientation, size, and surface area of the column packing and trays.

Operation of the column near the flooding pressure drop allows the use of smaller diameter columns. However, by using smaller diameter columns and/or by operating near the flooding pressure drop, the possibility that slight variations in the flow rates of the gaseous and liquid streams can cause flooding is greatly increased. Accordingly, it is desirable to operate the column at some fraction of the flooding pressure drop which is less than 100 percent of the flooding pressure drop. Preferably the column is operated at less than about 90 percent of the flooding pressure drop, more preferably, at about 60 to 80 percent of the flooding pressure drop and most preferably, at less than about 50 percent of the flooding pressure drop. The particular column design, packing or trays selected, and flow rates are readily determinable by those skilled in the art.

A key feature of this invention is the discovery of a means for reducing the pressure drop in a column for contacting gaseous and liquid streams, wherein at least a portion of the total pressure drop through the column is caused by foam. The means includes providing an amount of at least one non-foamable liquid, or essentially non-foamable liquid for injection into the gaseous stream at a location sufficient to reduce the total pressure drop in the column. The non-foamable can be any polar or non-polar liquid which does not have a tendency to foam when contacted with a gaseous stream. While almost all liquids, under certain conditions may be susceptible to the formation of liquid bubbles or foam, the type of foam which can cause pressure drop increases in columns is dynamic foam which is typically an evanescent foam stabilized by the Marangoni effect. Accordingly, the liquid being injected into the column should form less stable foam, if foam is formed at all, than the liquid being contacted in the column. For simplicity, all such liquids which have less tendency to foam than the liquids being contacted in the column will be referred to as non-foamable liquids. The most preferred non-foamable liquid is water or a liquid consisting essentially of water with a minor amount of impurities. Such impurities may include organic and inorganic salts, hydrocarbonaceous material, organic materials, and the like which do not significantly increase the tendency of the liquid being injected to foam.

The temperature of the non-foamable liquid being injected is preferably about 20° to 30° C. or more lower than the temperature of the liquid stream being contacted in the column. This provides, in addition to mechanical shock, thermal shock for reducing the amount of foam. In a typical column for stripping organics from water at a temperature within the range of from about 45° to about 55° C., the non-foamable liquid temperature will be within the range of from about 0° to about 15° C. Higher temperatures can be used for the non-foamable liquid, however, it has been found that the lower the temperature of the non-foamable liquid, the greater will be the pressure drop decrease. A more preferred temperature range for the non-foamable liquid is from about 5° to about 10° C.

The non-foamable liquid can be injected into the column or into the gas stream at a location which provides the greatest reduction in the pressure drop. In an upright, elongated column having countercurrent gaseous and liquid flows, the non-foamable liquid is typically injected into the column below the packed section or distribution tray using one or more spray nozzles. If the column contains more than one packed section or distribution tray, multiple injection locations may be used.

The amount of non-foamable liquid injected is typically a fraction of the total liquid flow rate through the column. Preferred amounts of non-foamable liquid injected into the column range from 5 to 20 percent of the total liquid flow through the column.

Many types and configurations of spray nozzles can be used in accomplishing the purposes of this invention. Preferably, the spray nozzle provides a high velocity discharge of liquid in a conical spray pattern. Suitable velocities range from about 12 to about 20 feet per second, with a velocity ranging from about 14 to about 18 feet per second being more preferred. Spray angles can range from about 30° to 120° or more.

In order to illustrate the invention, reference is made to the FIGURE. The FIGURE is a cross-sectional view, not to scale of a typical stripping column 2. Gaseous stream 4 is injected into the column 2 below the packed section 8. The liquid to be stripped 16 is fed into the upper section of the column above the packed section 8. Liquid distributor 22 provides a distribution of the liquid 16 across the diameter of the column 2. Exiting the top of the column is gaseous stream 6 containing impurities stripped from the liquid 16. As the liquid to be stripped 16 passes through the packing in a countercurrent manner to gaseous stream 4, there is contact between the gaseous stream and the liquid stream in the packing. The stripped liquid 10 exiting the bottom of the packed section 8 accumulates in the lower portion of the column for removal via stream 24 from the stripping column. In a particularly preferred embodiment, a portion of the stripped liquid 14 is used as the non-foamable injection fluid 18 which is injected via sprays 20 into the portion of the column below the packed section 8.

In order to further illustrate the advantages of this invention, the following example is given.

EXAMPLE

A stripping column (0.9 meters in diameter and 8.5 meters high) contains a 6.1 meter packed section. The packing is 5.1 centimeter IMTP® 50 (304 stainless steel) packing (commercially available from Norton Chemical Process Products). The liquid to be stripped contains the salt of a $C_{16-18}$ fatty acid (134 ppm) and is fed into the column above the packing at a rate of 643.5 to 1135.6 liters per minute. Air (20 cubic meters per minute) is fed into the stripping column below the packed section. The designed flooding pressure drop of the stripping column is 254 centimeters of water. The actual flooding pressure drop in the column is 101.6 centimeters of water. The stripped liquid is cooled and a portion (75.7 liters per minute) is sprayed into the column below the packed section utilizing a 60° conical spray nozzle (model MP218N commercially available from Bete Fog Nozzle Inc.) Utilizing the above equipment, the pressure drop with and without the use of the spray nozzles is shown in the following table.

| Run # | Spray Flow Rate (liters/min.) | Spray Temperature (°C.) | Pressure Drop (cm of $H_2O$) |
| --- | --- | --- | --- |
| 1 | 0 | — | 50.8 |
| 2 | 75.7 | 50° | 35.6 |
| 3 | 75.7 | 10° | 20.3 |

The present invention has been described and illustrated with reference to certain preferred embodiments. Nevertheless, it will be understood that various modifications, alterations, and substitutions may be apparent to one of ordinary skill in the art, and that such modifications, alterations and substitutions may be made without departing from the spirit and scope of the invention.

What is claimed is:

1. A method for reducing pressure drop in a packed column containing at least one packed section and having (i) at least one circulating, foamable liquid stream; and (ii) at least one gaseous stream whereby contact between (i) and (ii) in the packed column produces a foam sufficient to increase pressure drop across the packed section of the column and wherein the column has a flooding pressure drop, which method comprises injecting a non-foamable liquid into the column at a location, in an amount, and at a temperature which are sufficient to reduce the pressure drop in the packed column to less than 90 percent of the flooding pressure drop.

2. The method of claim 1 wherein the non-foamable liquid is a polar aqueous liquid.

3. The method of claim 1 wherein the non-foamable liquid consists essentially of water.

4. The method of claim 1 wherein the column is an upright, elongated column having a gaseous stream inlet, a gaseous stream outlet, a liquid stream inlet and a liquid stream outlet.

5. The method of claim 4 wherein the gaseous stream inlet is located below the packed section.

6. The method of claim 5 wherein the non-foamable liquid is injected as a spray into the gaseous stream down stream of the gaseous stream inlet.

7. The method of claim 5 wherein the non-foamable liquid consists essentially of water.

8. The method of claim 7 wherein the water has a temperature within the range of from about 5° to about 15° C.

9. The method of claim 7 wherein the total amount of water injected is within the range of from about 5 to about 20 percent of the total liquid flow through the packed column.

10. The method of claim 9 wherein the water is injected in a conical spray pattern having a spray angle ranging from about 30° to about 120°.

11. A method for reducing pressure drop in a column for contacting at least one gaseous stream and at least one liquid stream, wherein a portion of the pressure drop through the column is caused by foam, the method comprising, injecting an amount of an essentially non-foamable liquid into the gaseous stream prior to contact of the gaseous stream with the liquid stream, wherein the temperature and amount of non-foamable liquid is sufficient to decrease the pressure drop across the column by at least about 20 percent based on the total pressure drop across the column prior to injecting the non-foamable liquid.

12. The method of claim 11 wherein the non-foamable liquid is a polar aqueous liquid.

13. The method of claim 11 wherein the non-foamable liquid consists essentially of water.

14. The method of claim 11 wherein the column is an upright, elongated column having at least one packed section, a gaseous stream inlet, a gaseous stream outlet, a liquid stream inlet and a liquid stream outlet.

15. The method of claim 14 wherein the gaseous stream inlet is located below the packed section.

16. The method of claim 15 wherein the non-foamable liquid is injected as a spray into the gaseous stream down stream of the gaseous stream inlet.

17. The method of claim 15 wherein the non-foamable liquid consists essentially of water.

18. The method of claim 17 wherein the water has a temperature within the range of from about 5° to about 15° C.

19. The method of claim 17 wherein the total amount of water injected is within the range of from about 5 to about 20 percent of the total liquid flow through the packed column.

20. The method of claim 19 wherein the water is injected in a conical spray pattern having a spray angle within the range of from about 30° to about 120.

* * * * *